Patented May 4, 1943

2,317,987

UNITED STATES PATENT OFFICE 2,317,987

CATHETER

Vincent J. Flynn, Palisades Park, N. J., assignor to Wardlyn Corporation, Ridgefield, N. J., a corporation of New Jersey No Drawing. Application March 19, 1942, Serial No. 435,295

6 Claims. (Cl. 128—349)

The invention relates to improvements in surgical devices such as catheters, bougies and the like and more especially to ureteral catheters.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The present invention is in part an improvement upon the subject matter of my Patents Nos. 2,237,218; 2,237,219; 2,237,220; 2,237,221; and 2,237,222, granted April 1, 1941.

The invention is directed to providing improved surgical devices, particularly in the field of catheters, bougies, and the like, hereinafter generally designated as "catheters." I have found that catheters formed of synthetic resin compositions as hereinafter set forth are particularly effective and superior in practice and after extensive use and experience therewith have found same to possess many advantages not found in catheters made of other compositions, including the cellulose derivative materials covered in my prior patents referred to above. The synthetic resin compositions hereinafter referred to are found to be particularly adapted to the construction of catheters by the process of extrusion from a thermoplastic mass and when so formed they possess qualities of strength, durability, longevity and functional superiority far beyond any composition now known. However, the compositions herein disclosed may also be used for the production of catheters and the like by other methods, such as molding by injection, compression or transfer.

In general I have found that compositions formed of co-polymers of vinyl chloride and vinyl acetate impart the desired improvements to such surgical devices, particularly when same are formed by extrusion or molding. In particular I have found that the co-polymer of 80% vinyl chloride and 20% vinyl acetate is most effective. This composition is commercially available under the trade name "Vinylite" and is the "VYNW" grade of the Carbide & Carbon Chemicals Corporation.

Catheters formed from a plasticized mass of said material are found to have much higher recovery factor and are more "rubbery" or elastic than catheters of cellulose derivatives or other known compositions. This higher recovery quality is important not only in the general constitution of the catheter but more particularly at those points where the catheter is normally somewhat weak, as at the "eye" near the end of a whistle tip catheter. At such points the eyes are formed by displacing the matrix material leaving an exposed wall containing a smaller amount of material. Catheters composed of materials deficient in these qualities have been found to buckle and sometimes break in such weakened areas whereas by using the compositions herein disclosed I have found that the shape of the catheter is maintained under flexing so that it does not flatten, buckle, spread out or crack and returns immediately to its original shape when the flexing is discontinued.

This recovery factor or greater elasticity is also exceedingly important in urological practice, as for example in probing for the ureteral orifice in the bladder. During the probing operation the material tends to bend out of line and a catheter which lacks an adequate recovery factor fails to return promptly or at all to a straight line condition. Hence the next probe is not in line with the movement of the major axis of the catheter. With my new catheter, the recovery factor of the material causes it to return promptly into line with the main length of the catheter so that successive probings can rapidly be carried out without misalinement.

For surgical use it is also very important that a catheter be highly maneuverable into long and narrow tortuous passages. In skilled hands such an instrument is relied upon to transmit information to the surgeon by the sense of feel. The catheter of my invention is well adapted for this antenna-like function as the elasticity or recovery qualities thereof cause it to be a lively transmitter of tactile impressions to the hand and mind of the manipulator.

My new catheter is also superior in durability and longevity, in contrast to other compositions which become softened by contact with water or other liquids so that they become flaccid and unusable after as little as 15 minutes exposure in the full bladder. My new catheter does not change in this respect after many hours of immersion. With other compositions it also has been found that prolonged contact with water causes the plasticizer in the composition to partially dissolve out so that the catheter changes in plasticity, becoming stiffer and ultimately unusable. With my catheter the water absorption is practically nil so that the original quantity of plasticizer remains constant throughout indefinite periods of use.

Also, because of the above-described qualities, my new catheter is usable with a very much wider range of sterilizers. Its heat resistance is very much higher so that it can be sterilized by boiling water. It is also unaffected by alcohol, ether, or carbolic acid and is therefore usuable with all of the sterilizers commonly employed in surgery. In general, catheters formed in accordance with my invention have to an ideal degree the qualities desirable in catheters. That is, they maintain constantly over indefinite periods of time a proper balance between flexibility and rigidity, while their qualities of strength and durability are also superior. These qualities thus provide a catheter which not only has high durability and longevity but which also has greatly improved functional qualities which are especially important in surgical use.

A specific example of a preferred formula for catheter compositions embodying my invention is as follows:

20 to 45% by weight of dibutyl cellosolve phthalate;

40% by weight of metallic lead powder whitened with a suitable proportion of lead titanate;

15 to 40% by weight of the co-polymer of vinyl chloride and vinyl acetate formed from a mixture of 80% vinyl chloride and 20% vinyl acetate.

The dibutyl cellosolve phthalate or equivalent is used as a plasticizer and the proportion thereof will vary in accordance with the result desired. In practice I find that it is desirable for the final composition to be sufficiently thermoplastic that its rigidity will be somewhat reduced by internal body temperature, so that the part of the catheter which is introduced into the body will become somewhat more pliable than that outside the body and being manipulated by the operator. Other plasticizers which may be used are tricresyl phosphate and di-octyl phthalate.

It will be understood that the foregoing composition is preferred and that the resin co-polymer specified has been found most suitable and is that which is now obtainable commercially. It will be understood that the invention is not limited to such specific co-polymer, however, and that other similar co-polymers formed from different proportions of vinyl chloride and vinyl acetate, as for example 50% each, also fall within the scope of my invention.

The foregoing composition is preferably thoroughly mixed, as in a mechanical Banbury mixer. The material so formed is then extruded through a die of appropriate size and shape so as to form cylindrical catheter stock. In the preferred form catheters formed therefrom are preferably long, externally smooth, circular tubes of small outside diameter primarily intended for ureteral exploration and treatment, but not limited to such uses. The standard length for such catheter is normally about 30 inches and the external diameter may be as small as .050 inch. When designed for use as a catheter the extruded tube is provided with a small interior circular bore or lumen which extends from the open rear end to near the tip, stopping short thereof to form a closed tip. The closed end is preferably remolded to form whatever type of tip is desired, such as the "olive" tip or the "whistle" tip, and one or more side wall openings or eyes are formed in the matrix wall near the closed end as required.

Preferably a longitudinal tensile-strengthening filament of nylon thread or the like is embedded in a wall of the catheter between the lumen and the outer surface so as to impart additional tensile strength thereto without stiffening or otherwise changing the inherent characteristics of the plastic matrix. Such construction is shown and claimed in my Patent No. 2,268,321, granted December 30, 1941.

In cases where it is desired to form a bougie, the extrusion of the plastic mass will be performed in a die so as to provide a solid rod of material rather than a tubular form as used for catheters. Urethral catheters and other generally similar surgical devices may also be made of the compositions of my invention.

At the close of the extrusion operation, the catheter may be dipped, sprayed, or otherwise coated with a suitable compound in solution, and the instrument may be smoothed, polished, printed upon or otherwise treated to produce a finished appearing instrument. The printing operation may be conducted upon the extruded compound, either before or after the catheter is coated with a fluid compound, and either before or after the polishing or other finishing operation.

The invention in its broader aspects is not limited to the specific devices shown and described but departures may be made therefrom within the scope of the accompanying claims without departing from the principles of the invention and without sacrificing its chief advantages.

What I claim is:

1. A surgical device comprising a relatively long cylindrical member of small external diameter formed from a thermoplastic mass so as to be externally smooth, continuous, non-porous and highly flexible but having sufficient inherent tensile strength and longitudinal rigidity to permit insertion by itself into and through long, narrow and tortuous bodily passages, and being characterized by an elasticity giving a high recovery factor, a substantial proportion of said mass comprising a co-polymer of vinyl resins.

2. A surgical device comprising a relatively long cylindrical member of small external diameter formed from a thermoplastic mass so as to be externally smooth, continuous, non-porous and highly flexible but having sufficient inherent tensile strength and longitudinal rigidity to permit insertion by itself into and through long, narrow and tortuous bodily passages, and being characterized by an elasticity giving a high recovery factor, a substantial proportion of said mass comprising a co-polymer of vinyl chloride and vinyl acetate.

3. A surgical device comprising a relatively long cylindrical member of small external diameter formed from a thermoplastic mass so as to be externally smooth, continuous, non-porous and highly flexible but having sufficient inherent tensile strength and longitudinal rigidity to permit insertion by itself into and through long, narrow and tortuous bodily passages, and being characterized by an elasticity giving a high recovery factor, a substantial proportion of said mass comprising a co-polymer of vinyl chloride and vinyl acetate formed from 80% vinyl chloride and 20% vinyl acetate.

4. A catheter comprising a relatively long cylindrical member of small external diameter formed by extrusion from a thermoplastic mass so as to be externally smooth, continuous, non-porous and highly flexible but having sufficient inherent tensile strength and longitudinal rigidity to permit insertion by itself into and through long, narrow and tortuous bodily passages, and being characterized by an elasticity giving a high recovery factor, said mass comprising a co-polymer of vinyl resins and a plasticizer.

5. A catheter comprising a relatively long cylindrical member of small external diameter formed from a thermoplastic mass so as to be externally smooth, continuous, non-porous and highly flexible but having sufficient inherent tensile strength and longitudinal rigidity to permit insertion by itself into and through long, narrow and tortuous bodily passages, and being characterized by an elasticity giving a high recovery factor, a substantial proportion of said mass comprising a co-polymer of vinyl chloride and vinyl acetate and a plasticizer.

6. A catheter comprising a relatively long cylindrical member of small external diameter formed from a thermoplastic mass so as to be externally smooth, continuous, non-porous, and highly flexible but having sufficient inherent tensile strength and longitudinal rigidity to permit insertion by itself into and through long, narrow and tortuous bodily passages, and being characterized by an elasticity giving a high recovery factor, said mass comprising a co-polymer of vinyl chloride and vinyl acetate from 80% vinyl chloride and 20% vinyl acetate and a plasticizer.

VINCENT J. FLYNN.